United States Patent [19]
Wardle

[11] Patent Number: 5,879,533
[45] Date of Patent: Mar. 9, 1999

[54] METHOD OF ELECTROCHEMICAL MACHINING AND BEARING MANUFACTURED WITH SAID METHOD

[75] Inventor: Frank Peter Wardle, Swindon, England

[73] Assignee: SKF Industrial Trading & Development Company B. V., Nieuwegein, Netherlands

[21] Appl. No.: 860,553

[22] PCT Filed: Jan. 2, 1996

[86] PCT No.: PCT/NL96/00003

§ 371 Date: Oct. 21, 1997

§ 102(e) Date: Oct. 21, 1997

[87] PCT Pub. No.: WO96/20060

PCT Pub. Date: Jul. 4, 1996

[51] Int. Cl.$^6$ .................................................. B23H 11/00
[52] U.S. Cl. ........................................ 205/640; 205/641
[58] Field of Search .................................. 205/640, 641, 205/642, 643, 644, 645, 654

[56] References Cited

U.S. PATENT DOCUMENTS

| | | |
|---|---|---|
| 0,143,014 | 5/1985 | EPX . |
| 1,235,339 | 6/1971 | GBX . |
| 2,005,780 | 12/1969 | FRX . |
| 2,032,162 | 4/1971 | DEX . |

*Primary Examiner*—Kathryn Gorgos
*Assistant Examiner*—Thomas H. Parsons
*Attorney, Agent, or Firm*—Mayer, Brown & Platt

[57] ABSTRACT

The invention relates to electrochemical machining of metal pieces, and, in particular, rings of bearings, in a controlled way. To achieve this process, parameters, such as current, are actively controlled. This allows the raceway to be completed sooner and with a smoother, more circular surface. In addition the active control makes the formation of more complex forms possible and is suitable for the cheap manufacture of trilobed raceways.

6 Claims, 2 Drawing Sheets

METHOD OF ELECTROCHEMICAL MACHINING AND BEARING MANUFACTURED WITH SAID METHOD

This application is a national phase filing of international application Ser. No. PCT/NL 96/00003, filed Jan. 2, 1996.

BACKGROUND OF THE INVENTION

1. Field of the Invention

The present invention relates to a method of electrochemically machining a metal piece, wherein by applying a voltage, a current is passed across a narrow gap (6) formed by said metal piece and an adjustable electrode means (2) to locally remove material from the metal piece, electrolyte (A) being supplied to the gap (6) in a direction substantially tangential to the surface of the metal piece, and the metal piece being rotated around its axis, the amount of current being under the control of a sensing means capable of sensing the surface of the metal piece.

2. Description of the Related Art

Such a method is known from U.S. Pat. No. 4,456,516. Here, the general roundness of a cylindrical shaft is improved by electrochemical machining. A bracket is shaped to be slidably associated with the shaft in a two point contact. The bracket comprises a contact sensor which controls the current passed across a gap formed by the shaft and an electrode.

DETAILED DESCRIPTION OF THE INVENTION

It is an object of the present invention to provide a method of electrochemical machining in which a fast and precise control of the machined surface is obtained.

To the end, the method according to the invention is characterized in that the metal piece is a bearing ring, and wherein the electrochemical local removal of material from the bearing ring is enhanced by controlling a parameter chosen from the group of i) changing the speed with which the bearing ring is rotated around its axis to change the time during which a local elevation is subjected to electrochemical machining; and ii) increasing the voltage when the gap is narrow due to a local elevation on the bearing ring, said local removal being controlled by obtaining data from a sensing means comprising the bearing ring, the adjustable electrode means and a Volt-Ampere meter, and using the voltage and current being measured as data to control the parameter.

The width of the gap will vary with the angular position of the bearing ring as it rotates around its axis, in accordance with irregularities on the surface of the bearing ring as well as any out-of-roundness. The change in gap width corresponds to a change in the resistance and consequently in the current, thus removing more material when the gap is narrow and less when the gap is wide. In this way, elevations are removed and the surface of the bearing ring is smoothed.

Now, according to the invention, the material is removed in a controlled way to speed up this process using the voltage and current being measured as data to control the parameter, i.e. when the gap is narrow, the electrochemical removal of material from the bearing ring is enhanced by adjusting relevant process parameters. With this active control, it is possible to have more control over the final form of the bearing ring and obtain this form faster. For example, it is possible to increase the voltage when the gap is narrow due to an elevation on the metal piece, resulting in additionally increase current, which in turn enhances the removal rate. It is also possible to stop or slow down the rotation of the bearing ring around its axis, which causes in, particular, the elevation to be subjected to the electrochemical treatment. Thus, with the active control according to the invention, there is more control over the final form of the bearing ring and this form can be achieved faster. Thus, it is possible to obtain bearing rings with improved circular form or with more complex forms.

According to a preferred embodiment, the method according to the invention is characterized in that the bearing ring is a cylindrical roller bearing inner ring and material is removed from the raceway of the outer ring while sa harmonic variation is superimposed on the current at three times the frequency of the rings rotational speed, resulting in a trilobed raceway.

In this way it is possible to obtain trilobed rings cheaply, which allows a more widespread use of the superior bearings containing these rings.

The invention also relates to bearings comprising rings manufactured with the method according to the invention.

BRIEF DESCRIPTION OF THE DRAWING

The invention will now be elucidated with the aid of the drawing, illustrating the invention by way of example.

FIG. 1 shows a bearing ring 1 as a metal piece to be machined, said ring 1 being provided with a raceway which has to be treated electrochemically. Raceways may have out-of-roundness and elevations of up to ten $\mu$m, resulting from previous operations such as grinding. Removing these irregularities results in raceways with a circular geometry and consequently with reduced noise levels and increased operational life. An electrode means 2 includes a channel 3 for delivering electrolyte A through said channel 3 to an orifice 4. The electrode means 2 comprises an electrode 5 which is electrically isolated from the electrolyte A, apart from the end of the electrode 5 which forms a narrow gap 6 with the ring 1. Electrolyte A is passed, through the orifice 4, tangentially to the ring 1 through the gap 6 at a uniform velocity. The pressure with which the electrolyte A is passed through the gap is not very critical but higher pressures are unfavourable due to turbulence of the electrolyte resulting in uneven machining. The rotational direction of the ring 1 and the tangential electrolyte flow are preferably opposite to each other as this was found to give the best results. A DC power supply 7 maintains the ring 1 via a slip ring 8 at a positive voltage relative to the electrode 5.

For the controlled removal of the amount of material from a particular part of the ring 1 data is obtained on where and how much material should be removed. The data for controlled removal of material are obtained using the ring 1, the electrode 5 and a volt-ampere meter (not shown), wherein both the voltage and current are measured to derive the required data. The data is then used to adjust the voltage applied over the gap. FIG. 1 shows a schematic electric circuit comprising a shunt 9, bandpass filter 10 and amplifier 11. The current through the shunt 9 is used to determine the level of feed-back to the power supply 7. Use of the electrode 2 and the ring 1 to control the electrochemical machining brings with it the advantage that the place where material is to be removed and the place where data is obtained are the same and data processing is near instantaneous, and is the simplest possible, as no time or angular position dependent information has to be processed for the proper place of the ring 1 to be machined. Using a constant angular velocity of the ring and controlling the amount of material removed by varying the voltage applied it proved to be possible to reduce the out-of-roundness of a ring 1 from 8 μm to 0.5 μm, compared to 2–3 μm with state of the art electrochemical machining procedures. data obtained comprises information on the deviations of the roundness of the ring 1 and this data is used to control the local removal of material, for example, by changing the voltage applied as described above or by changing the length of time during which that particular part of the ring 1 is left under the electrode end 5. Thus, the time needed to obtain a raceway with the desired quality is shortened. It is remarked that changing the voltage is usually easier to accomplish and gives more accurate results than changing the length of time. However, the latter possibility may have advantages during the first stages of the electrochemical machining operation.

Figure 1:
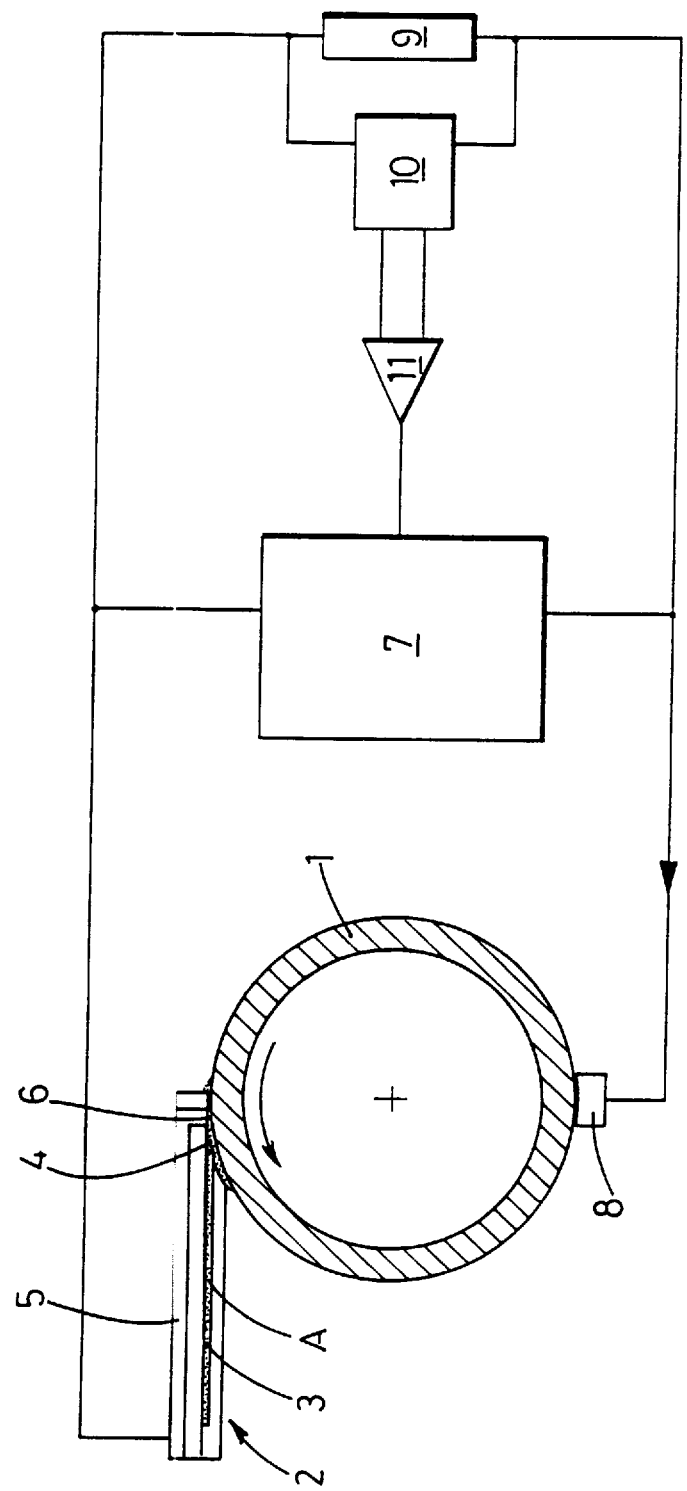
FIG. 1 is a schematic view of the key components suitable for controlled rounding of a ring.
Figure 2:
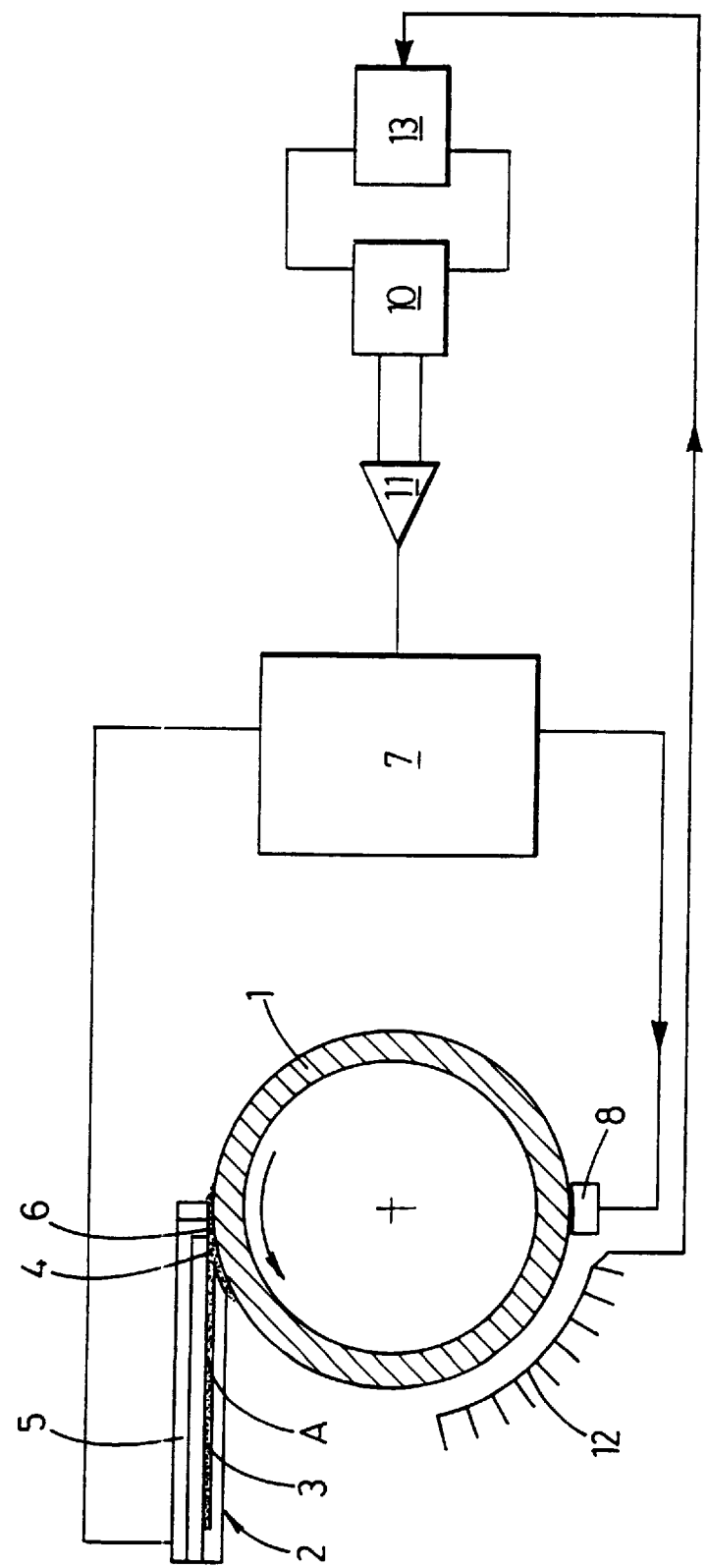
FIG. 2 is a schematic view of the key components suitable for controlled manufacture of a ring with a trilobed raceway.

The method according to the invention offers the possibility to control the form of a raceway and allows the cheap manufacturing of a trilobed raceway, for example, by superimposing a harmonic variation on the current at three times the frequency of the ring's rotation. To this end, the angular position of the ring 1, which is usually an inner bearing ring, is continuously monitored, for example, by position registration means 12 as shown in FIG. 2. The position registration means 12 controls a wave from generator 13 to modify the DC power supply 7.

The electrochemical machining process can be speeded up by using a group of electrodes 5. The electrodes of a group are preferably in an equally spaced relationship to each other. For the manufacture of a trilobed ring, it is preferred to use one electrode for control over the form of the bearing ring while the others are used to improved the smoothness of the raceway.

The electrode end 5 can be moved toward the axis of the ring 1 to adjust the width of the gap 6 as required

I claim:

1. Method of electrochemically machining a metal piece, wherein by applying a voltage a current is passed across a narrow gap (6) formed by said metal piece and an adjustable electrode means (2) to locally remove material from the metal piece, electrolyte (A) being supplied to the gap (6) in a direction substantially tangential to the surface of the metal piece, and the metal piece being rotated around its axis, the amount of current being under the control of a sensing means capable of sensing the surface of the metal piece, characterized in that the metal piece is a bearing ring (1), and wherein the electrochemical local removal of material from the bearing ring (1) is enhanced by controlling a parameter chosen from the group of i) changing the speed with which the bearing ring (1) is rotated around its axis to change the time during which a local elevation is subjected to electrochemical machining; and ii) increasing the voltage when the gap is narrow due to a local elevation on the bearing ring, said local removal being controlled by obtaining data from a sensing means comprising the bearing ring (1), the adjustable electrode means (2) and a Volt-Ampere meter, and using the voltage and current being measured as data to control the parameter.

2. Method according to claim 1, characterized in that the bearing ring (1) is rotated around its axis at a constant angular velocity and the amount of material removed is controlled by varying the voltage applied.

3. Method according to claim 1, characterized in that the rotational direction of the bearing ring (1) and the tangential electrolyte (A) flow are opposite to each other.

4. Method according to claim 1, characterized in that a group of electrodes (5) is used.

5. Method according to claim 4, characterized in that the electrodes (5) of a group are in an equally spaced relationship to each other.

6. Method according to claim 1, characterized in that the bearing ring (1) is a cylindrical roller bearing inner ring and material is removed from the raceway of the outer ring while a harmonic variation is superimposed on the current at three times the frequency of the rings rotational speed, resulting in a trilobed raceway.

* * * * *